(12) United States Patent
Mondrusov et al.

(10) Patent No.: US 7,721,418 B2
(45) Date of Patent: *May 25, 2010

(54) VALVE STEM INSTALLATION SYSTEM

(75) Inventors: Eugene M. Mondrusov, Novi, MI (US); Ben Giacona, Grosse Pointe Woods, MI (US); Brian Hoy, Brighton, MI (US); Dan Pellerin, Howell, MI (US)

(73) Assignee: Durr Systems, Inc., Plymouth, MI (US)

( * ) Notice: Subject to any disclaimer, the term of this patent is extended or adjusted under 35 U.S.C. 154(b) by 1176 days.

This patent is subject to a terminal disclaimer.

(21) Appl. No.: 11/218,870

(22) Filed: Sep. 2, 2005

(65) Prior Publication Data

US 2006/0107510 A1    May 25, 2006

Related U.S. Application Data

(63) Continuation-in-part of application No. 11/095,153, filed on Mar. 31, 2005, now Pat. No. 7,578,052, and a continuation-in-part of application No. 10/846,823, filed on May 14, 2004, now Pat. No. 7,322,089.

(60) Provisional application No. 60/606,964, filed on Sep. 3, 2004.

(51) Int. Cl.
   *B23P 21/00* (2006.01)
   *B23P 19/10* (2006.01)

(52) U.S. Cl. .......................... 29/714; 29/720; 29/221.5; 29/407.04; 29/407.1; 73/146.8

(58) Field of Classification Search .................. 29/714, 29/717, 720, 407.04, 407.09, 407.1, 221.5, 29/890.123, 894.3, 894.35, 894.351; 73/146.8
See application file for complete search history.

(56) References Cited

U.S. PATENT DOCUMENTS

| | | | |
|---|---|---|---|
| 1,850,053 A | 3/1932 | Stevens |
| 2,016,994 A | 10/1935 | Fleming |
| 2,665,747 A | 1/1954 | Harrison |
| 2,894,262 A | 7/1959 | Schafroth |
| 3,587,872 A | 6/1971 | Pauly et al. |
| 3,835,982 A | 9/1974 | Zappia |
| 4,007,827 A | 2/1977 | Mattos |
| 4,064,923 A | 12/1977 | German et al. |
| 4,146,126 A | 3/1979 | Mattos |

(Continued)

*Primary Examiner*—David P Bryant
*Assistant Examiner*—Sarang Afzali
(74) *Attorney, Agent, or Firm*—Howard & Howard Attorneys PLLC

(57) ABSTRACT

A valve stem installation system (10) includes a conveyor (24) for moving wheel (14). A controller (60) is adaptable for segmenting the wheel (14) into a plurality of sections (S1-S11). A detector (70) identifies and signals a general location of the aperture (12) to the controller (60) to identify a target section (S11) transmitted to the controller (60) by a first signal. A robotic manipulator (110, 112) is operably connected to the controller (60) and adaptable for inserting the valve stem into the aperture (12). A sensor (153) is connected to the robotic manipulator (110, 112) and is adaptable for visually identifying the target section (S11) and transmitting the general location of the aperture (12) within the target section by a second signal. The controller (60) generates a target signal transmitted to the robotic manipulator (110, 112) to increase the speed and accuracy of mating the valve stem into the aperture (12) in response to the target signal.

18 Claims, 7 Drawing Sheets

U.S. PATENT DOCUMENTS

| | | |
|---|---|---|
| 4,353,156 A | 10/1982 | Rosaz |
| 4,420,026 A | 12/1983 | Goiseau |
| 4,554,734 A | 11/1985 | Sander |
| 4,573,859 A | 3/1986 | Amano et al. |
| 4,621,671 A | 11/1986 | Kane et al. |
| 4,638,756 A | 1/1987 | Collmann |
| 4,829,749 A | 5/1989 | Hiyama et al. |
| 4,834,159 A | 5/1989 | Burger |
| 4,887,341 A | 12/1989 | Sakimori et al. |
| 4,921,293 A | 5/1990 | Ruoff et al. |
| 4,951,809 A | 8/1990 | Boothe et al. |
| 5,035,274 A | 7/1991 | Kinnick et al. |
| 5,094,284 A | 3/1992 | Curcuri |
| 5,131,531 A | 7/1992 | Chambers |
| 5,141,040 A | 8/1992 | Curcuri |
| 5,170,828 A | 12/1992 | Curcuri |
| 5,206,984 A | 5/1993 | Matumoto et al. |
| 5,328,224 A | 7/1994 | Jacobsen et al. |
| 5,341,911 A | 8/1994 | Gamberini et al. |
| 5,437,490 A | 8/1995 | Mimura et al. |
| 5,529,171 A | 6/1996 | Langenbeck |
| 5,570,920 A | 11/1996 | Crisman et al. |
| 5,588,688 A | 12/1996 | Jacobsen et al. |
| 5,685,210 A | 11/1997 | Ringle et al. |
| 5,749,141 A | 5/1998 | Matsumoto |
| 5,876,501 A | 3/1999 | Doan |
| 5,940,960 A | 8/1999 | Doan et al. |
| 6,026,552 A | 2/2000 | Matsumoto |
| 6,209,684 B1 | 4/2001 | Kane et al. |
| 6,325,202 B1 | 12/2001 | Gaines |
| 6,478,143 B1 | 11/2002 | Enomoto |
| 6,481,083 B1 | 11/2002 | Lawson et al. |
| 6,484,601 B1 | 11/2002 | Arrichiello |
| 6,505,870 B1 | 1/2003 | Laliberte' et al. |
| 6,510,942 B2 | 1/2003 | McTaggart et al. |
| 6,668,678 B1 | 12/2003 | Baba et al. |
| 6,801,126 B2 | 10/2004 | Harm |
| 2003/0000812 A1 | 1/2003 | McTaggart et al. |
| 2003/0010608 A1 | 1/2003 | Jaynes |
| 2003/0051326 A1 | 3/2003 | Lawson et al. |
| 2003/0217595 A1 | 11/2003 | Banzhof et al. |
| 2004/0103740 A1 | 6/2004 | Townsend et al. |
| 2004/0187282 A1 | 9/2004 | Pellerin et al. |
| 2004/0237733 A1 | 12/2004 | Lewis |

VALVE STEM INSTALLATION SYSTEM

RELATED APPLICATIONS

This is a continuation in part application that claims the benefit of the non provisional patent application Ser. No. 11/095,153 for a VALVE STEM INSTALLATION SYSTEM AND METHOD OF INSTALLING VALVE STEM, filed on Mar. 31, 2005, now U.S. Pat. No. 7,578,052, and the benefit of the continuation in part application Ser. No. 10/846,823 for a VALVE STEM INSTALLATION ASSEMBLY USING RADIAL ZONE IDENTIFICATION SYSTEM, filed on May 14, 2004, now U.S. Pat. No. 7,322,089, and the benefit of the provisional patent application Ser. No. 60/606,964 for a TPM VALVE STEM INSTALLATION TOOL, filed on Sep. 3, 2004.

BACKGROUND OF THE INVENTION

1. Field of the Invention

The subject invention relates to a wheel and tire assembly for an automotive vehicle, and more particularly to an apparatus and method for mounting a valve stem into a wheel rim.

2. Description of the Prior Art

In the assembly of automotive wheel rims and tires, the tire is mounted onto the wheel rim and then inflated. Prior to mounting the tire, a valve stem is inserted into an aperture defined in the wheel rim to permit inflation of the tire. For manufacturing wheel rims on a large production scale, machines are used to automatically insert the valve stems into the wheel rims. Because the wheel rims of different sizes require differently sized valve stems, valve stemming machines must either operate on the wheel rims of a single size or be able to accommodate the use of several sizes of the valve stems.

Over the last few years, snap-in valve stems have become very popular in the automotive industry due to the ease of installation method. Clamp-in tire pressure monitoring systems type of a valve stem (the TPM) are similar to the snap-in valve stems, but also include a tire pressure monitor affixed to one end of the TPM. In order to install the TPM on the wheel rim, the TPM is placed through an opening defined in the wheel rim and then secured to the wheel rim by a retention nut over the TPM. A valve cap is then screwed onto the TPM to form an airtight seal and prevent dust and dirt from entering the valve.

Generally, as done in the past, mounting the valve stem into the wheel rim of any kind, have been performed manually. In particular, mounting the valve stem into the wheel rim has been performed by a stem-inserting tool. Such manual processes are expensive because of the labor and time involved. In addition, operations performed manually are subject to a processing error. Several prior art patents disclose processes for mounting the valve stem into the wheel rim. U.S. Pat. No. 6,026,552, for example, teaches a spinning device to spin a wheel, an optical sensor to locate a valve stem aperture while the wheel is spinning, and a press fitting device that can slide relative to the wheel and insert a valve stem after the valve stem aperture has been located.

U.S. Pat. No. 5,940,960, for example, teaches and automatic valve stemming apparatus including a spinning device to spin the wheel, an optical sensor to locate the valve stem aperture, and a valve stem insertion tool to insert a valve stem after the valve stem aperture has been located.

The art is also replete with various systems and methods, which involve a robot that installs a valve stem into a wheel rim. These systems are taught by U.S. Pat. Nos. 4,353,156; 5,940,960; 6,481,083; and 6,801,126. Other prior art devices utilize a rotatable carousel to dispense valve stems of varying sizes onto a valve stem insertion tool. The assembly line taught by the U.S. Pat. Nos. 4,353,156; 5,940,960; 6,801,126 and 6,481,083 are complex, bulky. Some of them require several separate valve stem mounting stations with the robotic manipulator moving the wheel rim to the respective valve stem mounting station. This prior art systems diminish assembly time and flexibility of assembling environment. These systems also performs numerous redundant operations, such as moving the wheel rim to different mounting stations which does not reduce time for assembly of the wheel rims and does not offer the flexibility needed in the modern manufacturing environment. Although the prior art valve stem installation systems are widely used in the automotive industry, these prior art designs have proven to be extremely complicated, and therefore non practicable, or have been inflexible in a manufacturing environment, particularly when a variety of valve stems are mated to a variety of the wheel rims.

One of the areas of continuous development and research is the pursuit of flexible systems operable to receive and process several differently configured rims. Another area is the pursuit of less costly valve stem insertion devices. Costliness can be defined by the capital investment required for putting the valve stem insertion system on the factory floor as well as the operating cost associated with the system. In pursuit of these goals, it would be desirable to develop a new design of the valve stem installation system adaptable for mating of at least two different valve stems into the wheel rim with high degree of accuracy and precision and at a high speed thereby eliminating the need of an extra unit, reduce space in manufacturing environment, and improving cost and efficiency of manufacturing process.

BRIEF SUMMARY OF INVENTION

An inventive valve stem installation system includes a conveyor for moving wheel rims having an aperture defined therein. A detector is cooperable with the conveyor. The detector identifies a general location of the aperture and signals the general location of the aperture to a controller via a first signal. The controller aligns the general location of the aperture with one of the sections, segmented by the controller, thereby identifying a target section. A robotic manipulator is operably connected to the controller. The robotic manipulator is adaptable for selectively engaging and inserting a valve stem and a pressure monitoring device (the TPM) into the aperture. An insertion tool is connected to the robotic manipulator. The insertion tool is adaptable for selectively engaging one of the valve stem and the TPM and interchangeably moving and inserting one of the valve stem and the TPM into the aperture as directed by the controller.

A sensor is connected to the robotic manipulator and is adaptable for visually identifying the target section and transmitting the general location of the aperture within the target section via a second signal. The controller integrates the first signal and the second signal through comparative software to generate a target signal. The target signal is transmitted to the robotic manipulator for adjusting movement of the robotic manipulator relative the target section thereby increasing the speed and accuracy of mating one of the TPM and the valve stem into the aperture in response to the target signal. The subject invention includes a method of engaging the valve stem and the TPM with the wheel rim having the aperture formed therein.

Accordingly, a valve stem installation system of the present invention is new, efficient, and provides for an effective way for selectively mounting the valve stems of various configurations into the respective wheel rim desirable to develop a new design of the valve stem installation system adaptable for mating of at least two different valve stems into the wheel rim with high degree of accuracy and precision and at a high speed thereby eliminating the need of an extra unit, reduce space in manufacturing environment, and improving cost and efficiency of manufacturing process.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
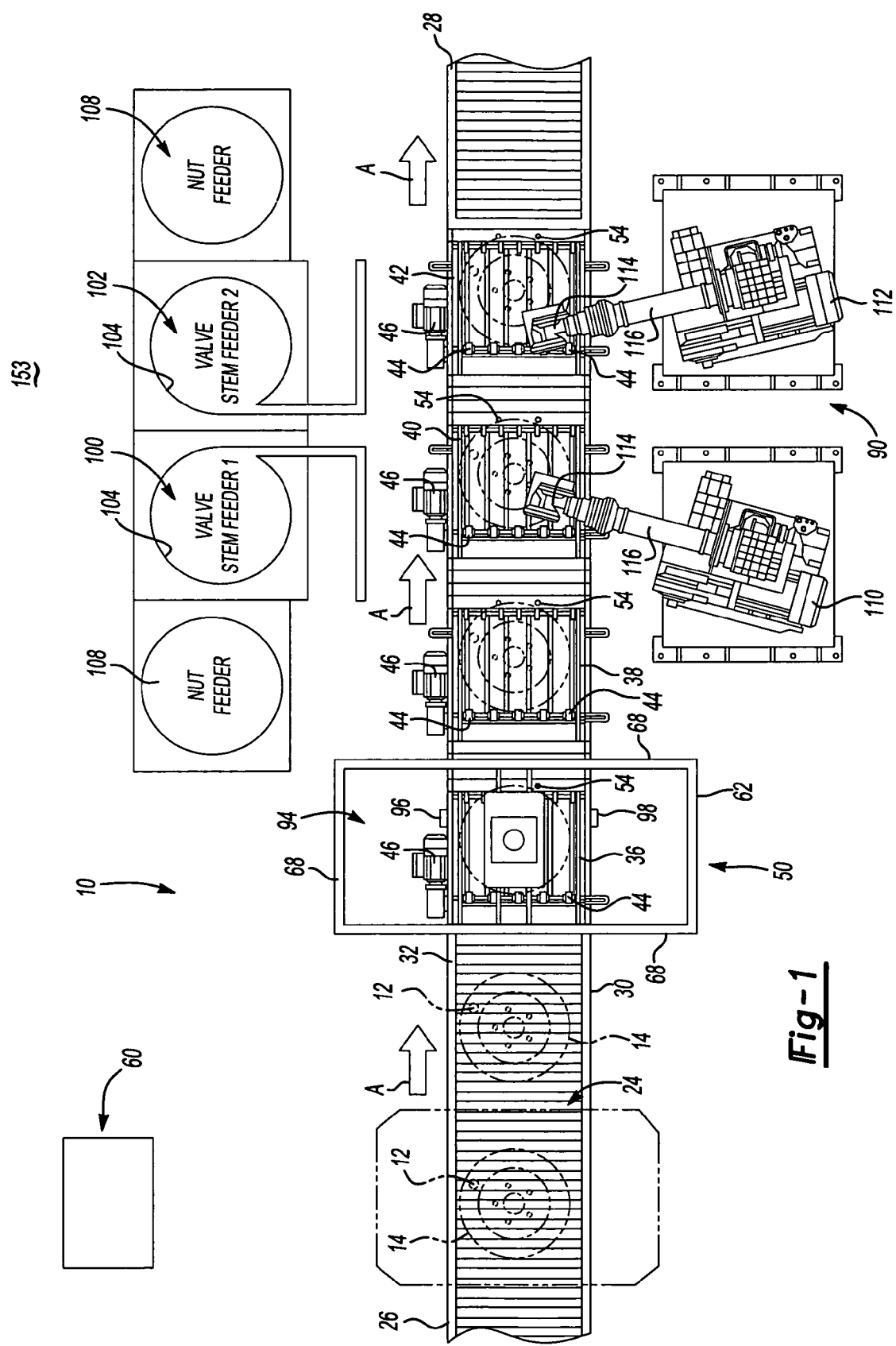
FIG. 1 is an elevational view of an inventive valve stem installation system takes from a top.
Figure 2:
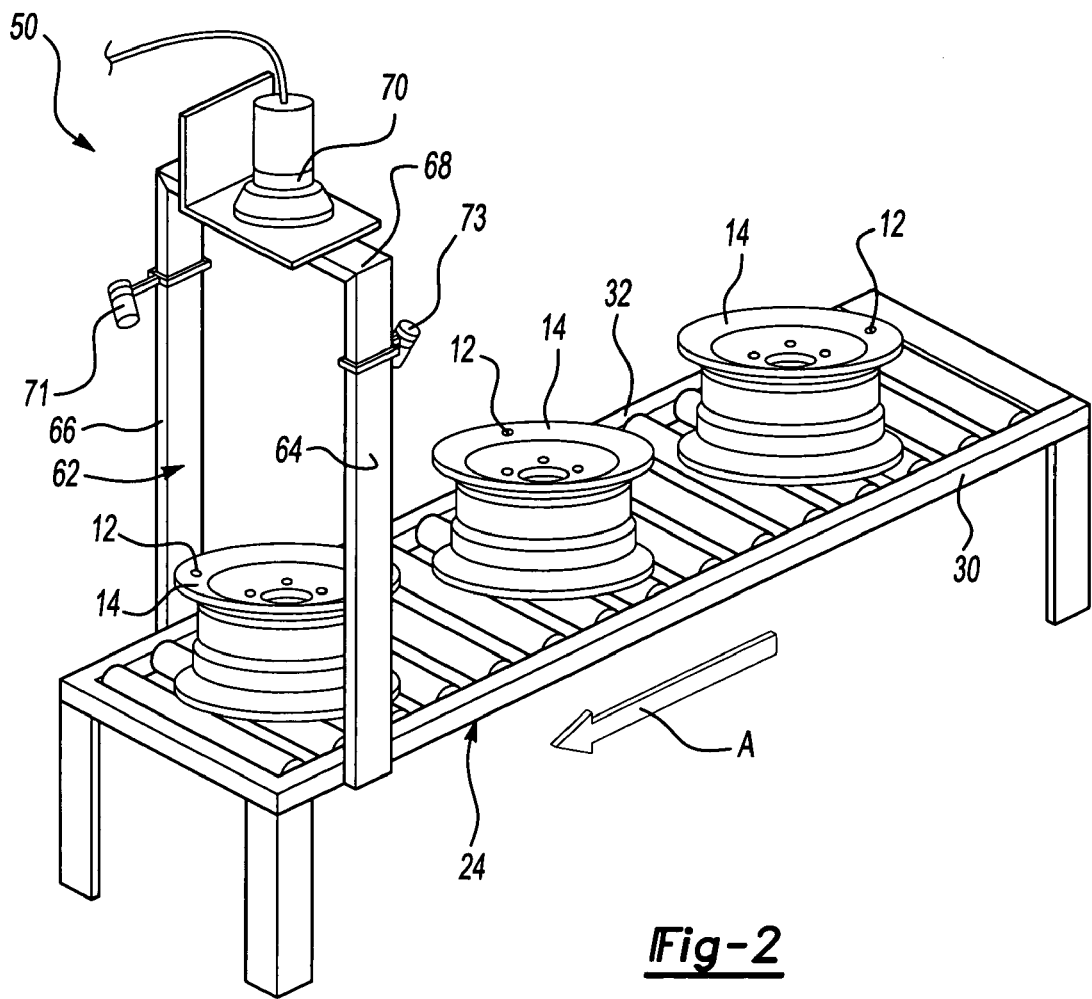
FIG. 2 is a perspective view of a detection device disposed about a conveyor for moving wheel rims.

Referring to FIGS. 1 and 2, a valve stem installation system (the system) is generally shown at 10. The system 10 is adaptable to insert an individual valve stem chosen from among a plurality of differently configured valve stems into an aperture 12 defined in a wheel rim 14. These valve stems include and are not limited to a standard rubber valve stem 16 (the valve stem) and a tire pressure monitoring device type of a valve stem 18 (the TPM), both known to those skilled in the art. Any of the aforementioned valve stems is inserted in the aperture 12 as the wheel rim 14 is moved along an assembly path, generally indicated by an arrow A. The TPM 18, for example, includes a pressure sensor for monitoring the pressure in a tire mounted to the wheel rim 14 and transmits a signal corresponding to the sensed pressure. The TPM 18 is affixed to the wheel rim 14 by a nut (not shown) disposed upon an opposite side of the wheel rim 14 from the pressure sensor. The system 10 is adaptable to insert any types of a valve stems other than the TPM 18 and the standard valve stem and any modifications thereof.

The system 10 includes a conveyance device, generally indicated at 24, for moving the wheel rims 14 of different sizes. The conveyance device 24 includes first 26 and second 28 ends and side walls 30, 32. A plurality of modules 36, 38, 40, 42 are aligned with respect to one another along the assembly path A of the conveyance device 24. The conveyance device 24 is lengthened or shortened by increasing or decreasing, respectively, the number of modules 36, 38, 40, 42.

Alternatively, the conveyance device 24 is formed from a single module, such as an endless conveyor loop (not shown). As best shown in FIG. 1, each module 36, 38, 40, 42 includes a plurality of rollers 44 rotatable about the axis. Those skilled in the mechanical art will appreciate that other conveyance devices may be used for moving the wheel rims 14 between the first end 26 and the second end 28. The rollers 44 support the wheel rims 14 during movement along the assembly path A. Each of the modules 36, 38, 40, 42 also includes a motor 46, respectively, mechanically engaged with the rollers 44 to rotate the rollers 44 around the axis. The rollers 44 and the respective motors 46 are operably associated with respect to one another by appropriate gearing, sprockets and chains, or pulleys and belts, generally indicated at 48. Those skilled in the mechanical art will appreciate that other mechanical engagements are used to associate each of the motors 46 with respective rollers 44. Each of the separate modules 36, 38, 40, 42 is disposed at a separate work station disposed along the conveyance device 24. The invention includes various associations of the modules 36, 38, 40, 42 in relation to the conveyance device 24.

A controller system, generally shown at 60, will be discussed in greater detail as the description of the system 10 proceeds. The controller system 60 is operably connected with the conveyance device 24 and an identification station or detector, generally shown at 50 and discussed in great details as the description of the system 10 proceeds. As best shown in FIG. 2, the identification station 50 of the present invention includes a frame, generally indicated at 62 extending upwardly from a floor. The frame 62 is further defined by a plurality of vertical posts 64, 66 interconnected by vertical beams or beam 68 at the respective tops, as shown in FIGS. 1 and 2, respectively. A camera 70 is supported by the vertical beam 68 and is positioned centrally between the vertical posts 64, 66 to scan the wheel rim 14 to determine a size, angle, and location of aperture 12 defined within an edge of the wheel rim 14. The information about the size, angle, and location of the aperture 12 is further transmitted to the controller 60. The wheel rim 14 is scanned by the camera 70 and the scanned image of the wheel rim 14 is communicated to the controller 60 via a first signal. The first signal includes and is not limited to structural features of the wheel rim 14 including the then-current location of the aperture 12. The identification station 50 also includes one or more lights 71 and 73 to enhance the quality of the scanned image.

The identification station 50 of the exemplary embodiment of the invention also includes a positioning device, generally shown at 80, disposed below the rollers 44 associated with the module 36. The positioning device 80 engages the wheel rim 14 at the identification station 50 and raises the wheel rim 14 from the rollers 44, toward the camera 70. The positioning device 80 rotates the wheel rim 14 after the location of the aperture 12 has been identified to a preferred position. For example, the positioning device 80 positions the aperture 12 to reduce the complexity of moving operations of a robotic device, generally shown at 90, disposed at a valve stem inserting station (to be described in greater detail below) downstream of the identification station 50.

Alternatively, the identification station 50 also includes a light curtain, generally shown at 94 including a beam emitting array 96 and a beam receiving array 98. The beam emitting array includes a plurality of individual beam emitters axially spaced along a first support structure and the beam receiving array includes a plurality of individual beam receivers axially spaced along a second support structure (both not shown). Corresponding emitters and receivers communicate with one another to sense the height of the wheel rim 14 disposed at one of the module 36. The light curtain 94 enhances the identification of the wheel rim 14 from among a plurality of differently configured wheel rims 14 by cooperating with the positioning device 80. For example, the positioning device 80 engages a surface of the wheel rim 14 when the positioning device 80 lifts the wheel rim 14 toward the camera 70. Alternatively, the positioning device 80 includes a sensor (not shown) to sense the amount of extension of the positioning device 80. Concurrently, the beam emitting array 96 and the beam receiving array 98 communicate with one another to sense a top surface and a bottom surface of the wheel rim 14.

Alluding to the above, the controller system 60 is adapted to receive signals from the sensor associated with the positioning device 80 and with the light curtain 94 and sense when the wheel rim 14 is moved by the positioning device 80. Specifically, the controller system 60 identifies the amount of extension of the positioning device 80 that corresponds to movement of the wheel rim 14, movement of the wheel rim 14 sensed by the light curtain 92. This axial distance may further enhance the identification of the wheel rim 14 from the plurality of differently configured wheel rims 14.

Preferably, the controller system 60 includes a controller device, i.e. computer, operably and electronically communicated with the identification station 50 and the robotic device 90. The computer has an input/output interface, a central processor unit, a random access memory, i.e. RAM, and a read only memory, i.e. ROM. The input interface is electrically connected with the robotic device 90 and the identification station 50. The controller is pre-programmed with the various tire wheel rim 14 size and types of the valve stem 16 or the TPM 18 to be engaged in the aperture 12. The ROM stores a program, i.e. comparative software that determines proper mating order and mating engagement between the particular wheel rim 14 and the valve stem 16 or the TPM 18. The comparative software integrated the first signal and a second signal (to be discussed as the description of the present invention proceeds) to generate a target signal.

The controller engages the motor 46 to rotate the rollers 44 associated with the modules 36, 38, 40, 42 and concurrently disengages the motor 56. The controller system 60 compares the image received from the camera 70 with a plurality of images stored in memory and identifies the particular configuration of the wheel rim 14. The scanned images stored in the memory of the controller correspond to all of the differently configured wheel rims 14 that pass through the identification station 50. Each of the images stored in memory is associated with structural characteristics and physical dimensions of a corresponding wheel rim 14 including the orientation of the aperture 12.

Figure 3:
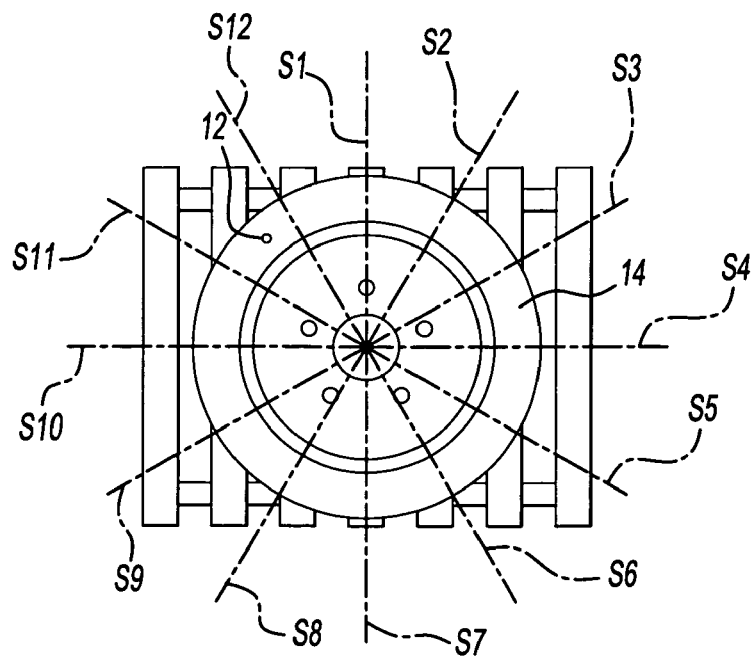
FIG. 3 is top view of a scanned image of the wheel rim divided into sections with an aperture disposed in one of the sections, i.e. target section.

As will be set forth more fully below, the controller system 60 controls processing steps performed downstream of the identification station 50 based, at least in part, on the physical dimensions of the wheel rim 14 identified from the scanned image received from the camera 70 via the aforementioned first signal. As best shown in FIG. 3, the controller system 60 divides the scanned image into a plurality of sections S1 through S11 and locates the aperture 12 with respect to the particular section S1 through S11 that defines the aperture 12. For example, the aperture 12 is defined by the section S11, wherein the section S11 is identified as a target section. Preferably, the controller system 60 divides or segments the wheel rim 14 with as many boundary lines as possible to define as many sections as possible. The greater the number of sections, the more accurate the initial locating of the aperture 12 will be. The controller system 60 moves pairs of the wheel rims 14 concurrently along the assembly path A between the identification station 50 and the valve stem insertion station defined by the robotic device. For example, a first wheel rim 14 is moved to the module 36 from the identification station 50 and maintained at the module 36 until a second wheel rim 14 is received by the identification station 50 and the aperture 12 defined by the second wheel rim 14 has been identified with respect to location and orientation.

After the wheel rim 14 at the identification station 50 has been processed, both of the wheel rims 14 individually disposed at the module 36 and at the module 38 are moved concurrently along the assembly path A. The wheel rim 14 formerly at the module 36 is moved to the module 38 and the wheel rim 14 formerly at the identification station 50 is moved to the module 36.

Referring again to FIG. 1, two stem feeders, generally indicated at 100 and 102, respectively, are included to deliver different sizes and shapes of the valve stems 16 and the TPM 18. The stem feeders 100 and 102 are positioned adjacent the conveyance device 24. Each stem feeder 100 and 102 stores one of the TPM 18 or the regular rubber valve stem 16. Each stem feeder 100 and 102 includes a hopper 104 that receives the valve stems 16 or the TPM 18. A bowl 106 receives the valve stem 16 or the TPM 18 from the hopper 104. The bowl 106 is rotated about its axis thereby by creating a centrifugal force that aligns and orients each of the valve stems 16 or the TPM 18 in to a single track escapement. The valve stems 16 or the TPM 18 are delivered by the centrifugal force into a stem pick-up port to be accessible by the robotic device 90. The bowl 106 stops rotating automatically when the stem pick-up port is full with the valve stems 16 or the TPM 18, and is turned on automatically, when the valve stems 16 or the TPM 18 in the stem pick-up port are required thereby preventing unnecessary damage to the valve stems 16 or the TPM 18 and loose valve stems 16 or the TPM 18. At least one nut feeder 108 is positioned adjacent one of the stem feeder 100 or 102 that contains the TPM 18.

Figure 4:
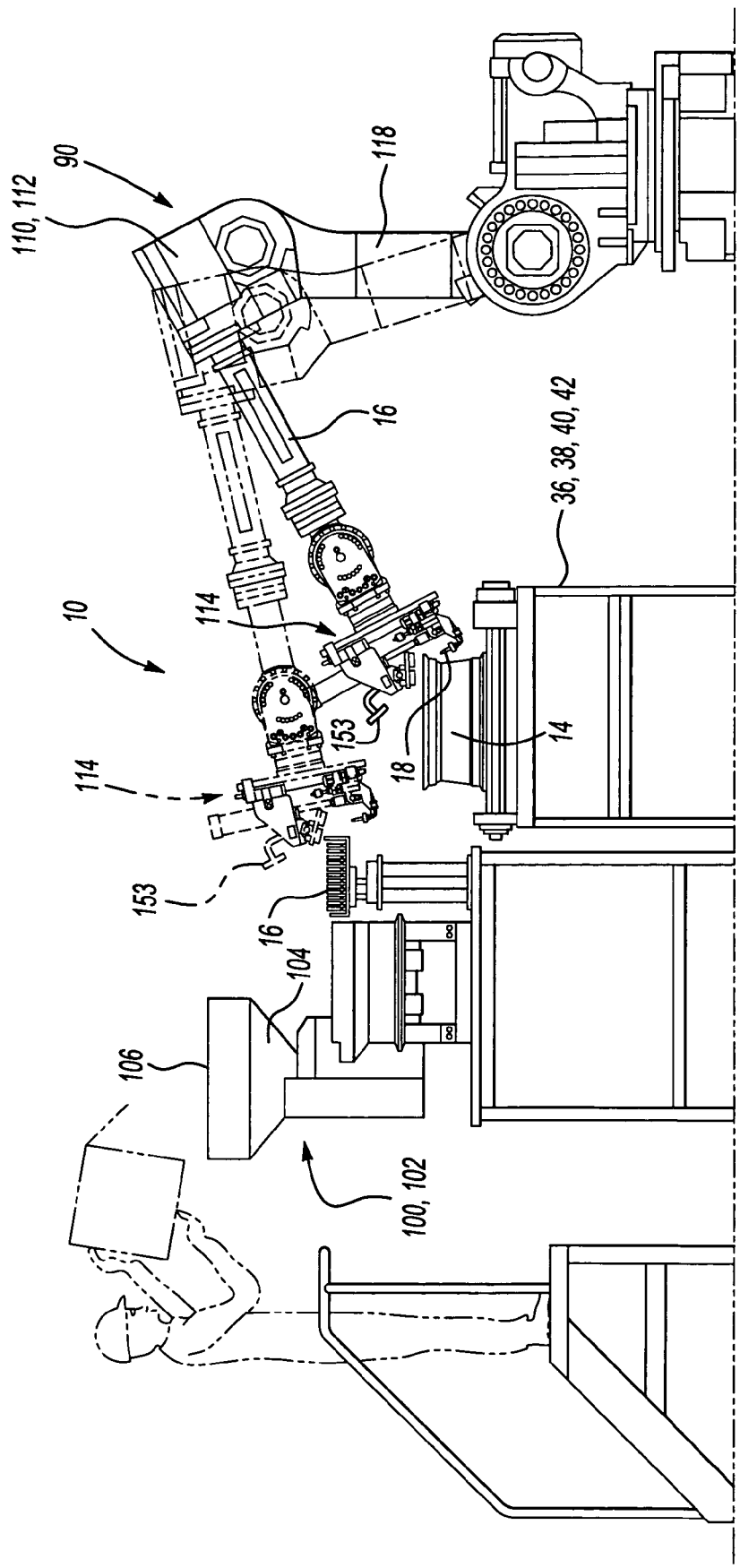
FIG. 4 is a side view of a robotic manipulator having a sensor connected thereto and inserting the valve stem into the aperture.

As best shown in FIG. 4, the robotic device 90 includes at least two robots 110 and 112 adjacent one another and adaptable for multi-axial movement relative to the wheel rim 14 and the conveyance device 24. Each of the robots 110 or 112 is controlled by the controller system 60 to insert valve stems 16 or the TPM 18 in the wheel rims 14 disposed at the modules 36, 38, 40, 42, respectively. The robots 110 and 112 are structured similarly and function similarly with respect to one and the other. The robot 110 includes an insertion tool, generally shown at 114 in FIG. 4, and a robot arm 116 pivotably engaged within a base support portion 118 defining an elbow joint therebetween. The robot arm 116 moves the insertion tool 114 into position to insert any of the valve stems 16 or the TPM 18 in the aperture 12 defined by the wheel rim 14.

Figure 5:
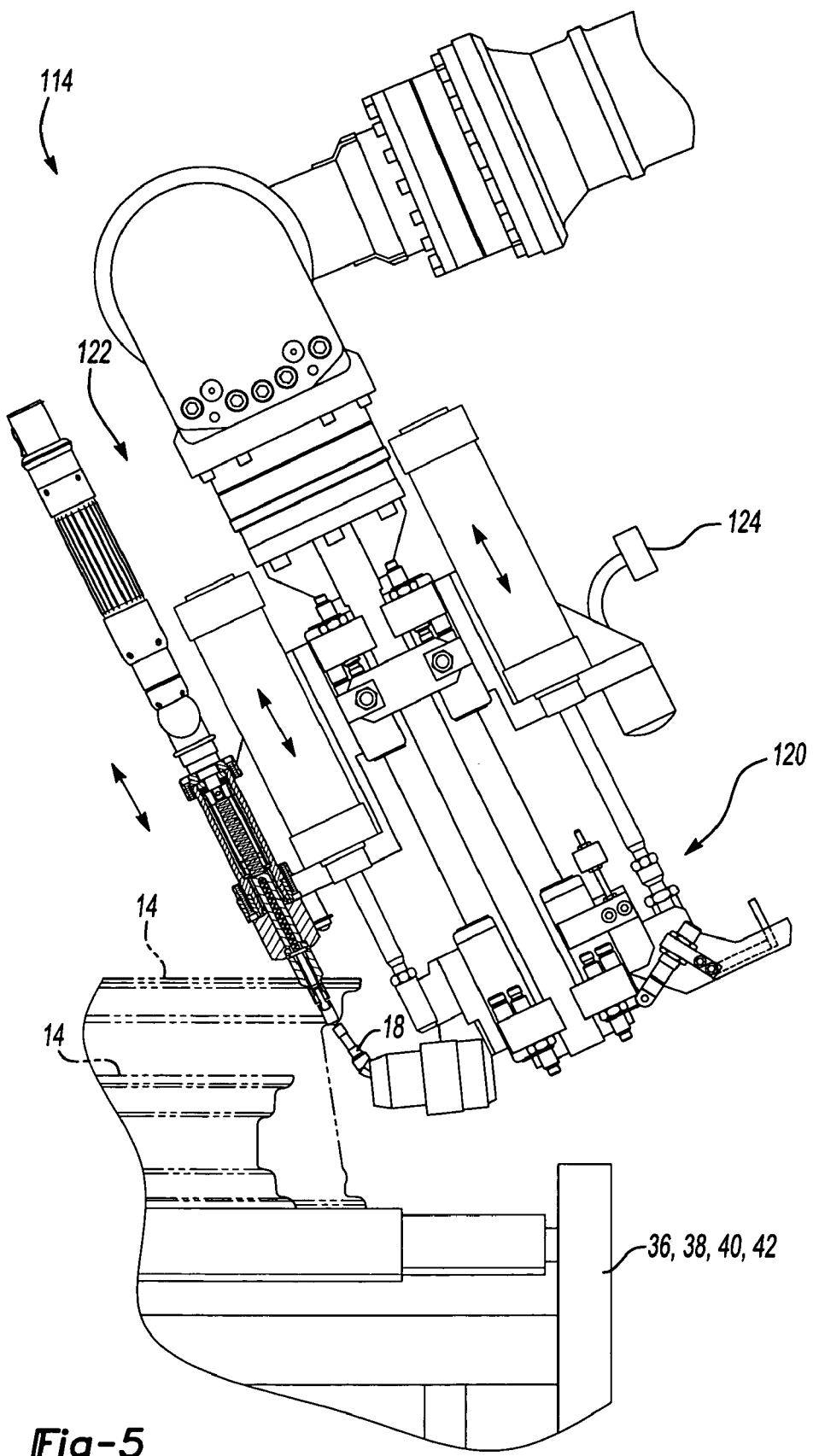
FIG. 5 is a cross sectional view of an inserting tool having a first inserting device for engaging and inserting the "snap-in" type valve stem into the wheel rim and a second inserting device having clamping mechanism for engaging and inserting the TPM into the wheel rim.

Referring to FIG. 5, the insertion tool 114 includes first and second insertion devices, generally shown at 120 and 122, respectively. The first 120 and second 122 insertion devices are configured to insert a differently configured valve stem, such as the valve stem 16 and the TPM 18. Preferably, the first insertion device 120 supports the standard valve stems 16 for insertion in the aperture 12 and the second insertion device 122 supports the TPM 18 for insertion in the aperture 12. The first and second insertion devices 120 and 122 and its functional and mechanical aspects are fully described in the patent application Ser. No. 11/095,153 assigned to the assignee of the present invention and is incorporated herewith by reference in its entirety.

As best shown in FIGS. 4 and 5, a sensor 124 is operably connected to the insertion tool 114. Depending on modification of the insertion tool 114, the sensor 124 is attached to the insertion tool 114 adaptable for engaging and inserting single type of the valve stem, as illustrated in FIG. 4 or several types of the valve stem, as shown in FIG. 5. The sensor 124 includes an optical sensor and the like, adaptable to scan an image of the wheel 14 at the target section S11 to determine precise location of the aperture 12 within the target section S11 thereby creating the second signal and transmitting the second signal to the controller 60 as the insertion tool 114 moves to the wheel 14 at the target section S11. The controller 60 adjusts movement of the insertion tool 114 to the wheel 14 in response to the target signal transmitted by the controller to the robot 110 or 112 as the comparative software of the controller integrates the first and second signals to create the aforementioned target signal. The sensor 124 supplements the camera 70 to enhance the speed and efficiency of the valve stem insertion process.

Figure 6:
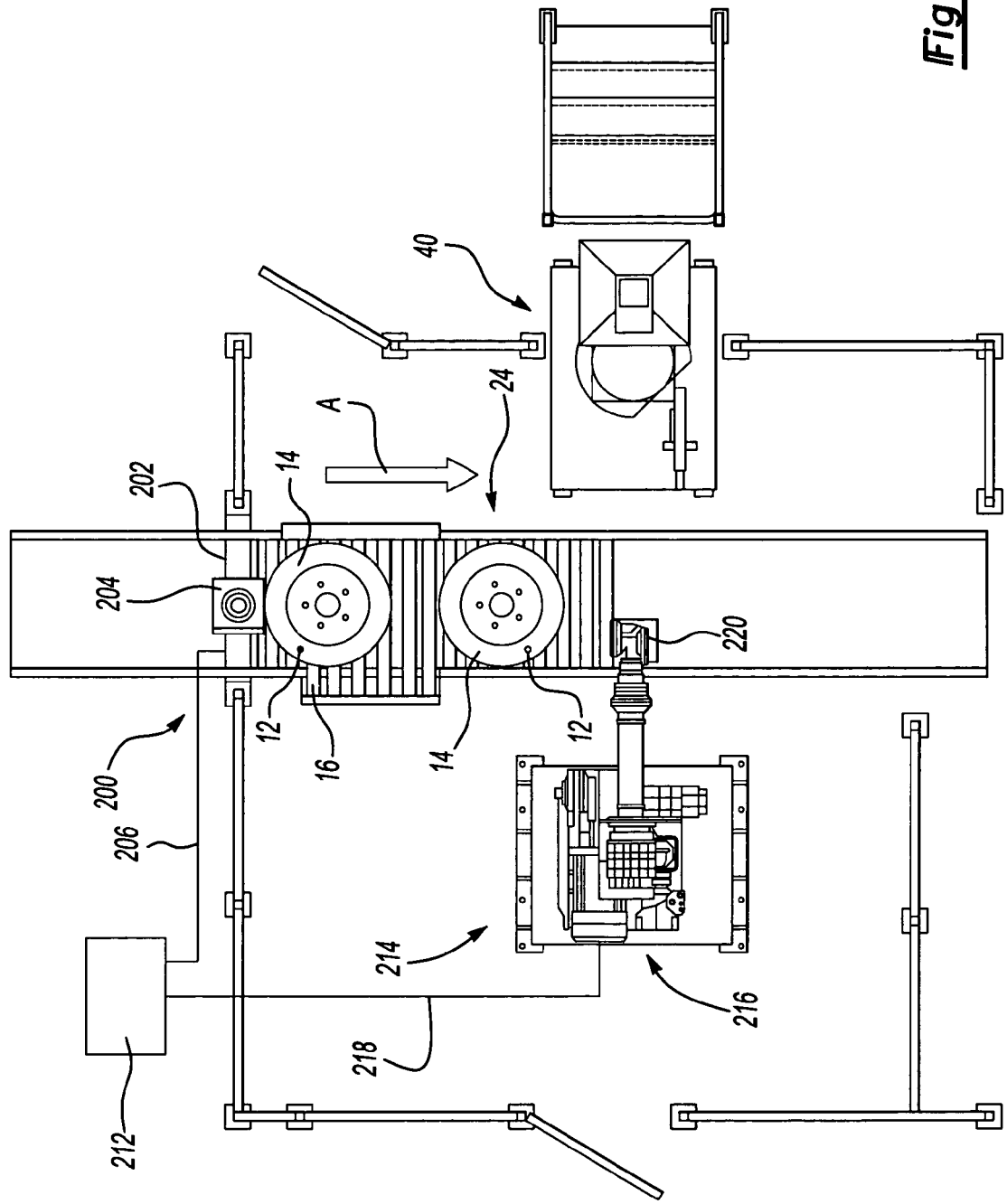
FIG. 6 is a top view of a first alternative embodiment of the valve stem installation system.

Alluding to the above, the inventive system 10 may include several alternative embodiments adaptable to be used at various manufacturing environments. As shown in FIG. 6, a first alternative embodiment of the system 10 is generally shown at 200. The wheel 14 is first moved to the locating station 202 and a scanned image of the wheel 14 is taken by a camera 204. The scanned image of the wheel 14 is communicated 206 to a controller 212 that divides the scanned image into a plurality of sections. The valve stem aperture 12 is located with respect to one of the sections. The wheel 14 is then moved to a stemming station, generally shown at 214 for insertion of a valve stem in the valve stem aperture 12. The valve stem is inserted with a robotic device, i.e. robot generally shown at 216. The robot 216 is operably communicated 218 with the controller 212 and moves an insertion tool 220 connected to the section that defines the valve stem aperture 12. As a result, the robot 216 is not required to move the insertion tool 220 around the periphery of the wheel 14 to locate the valve stem aperture 12.

Figure 7:
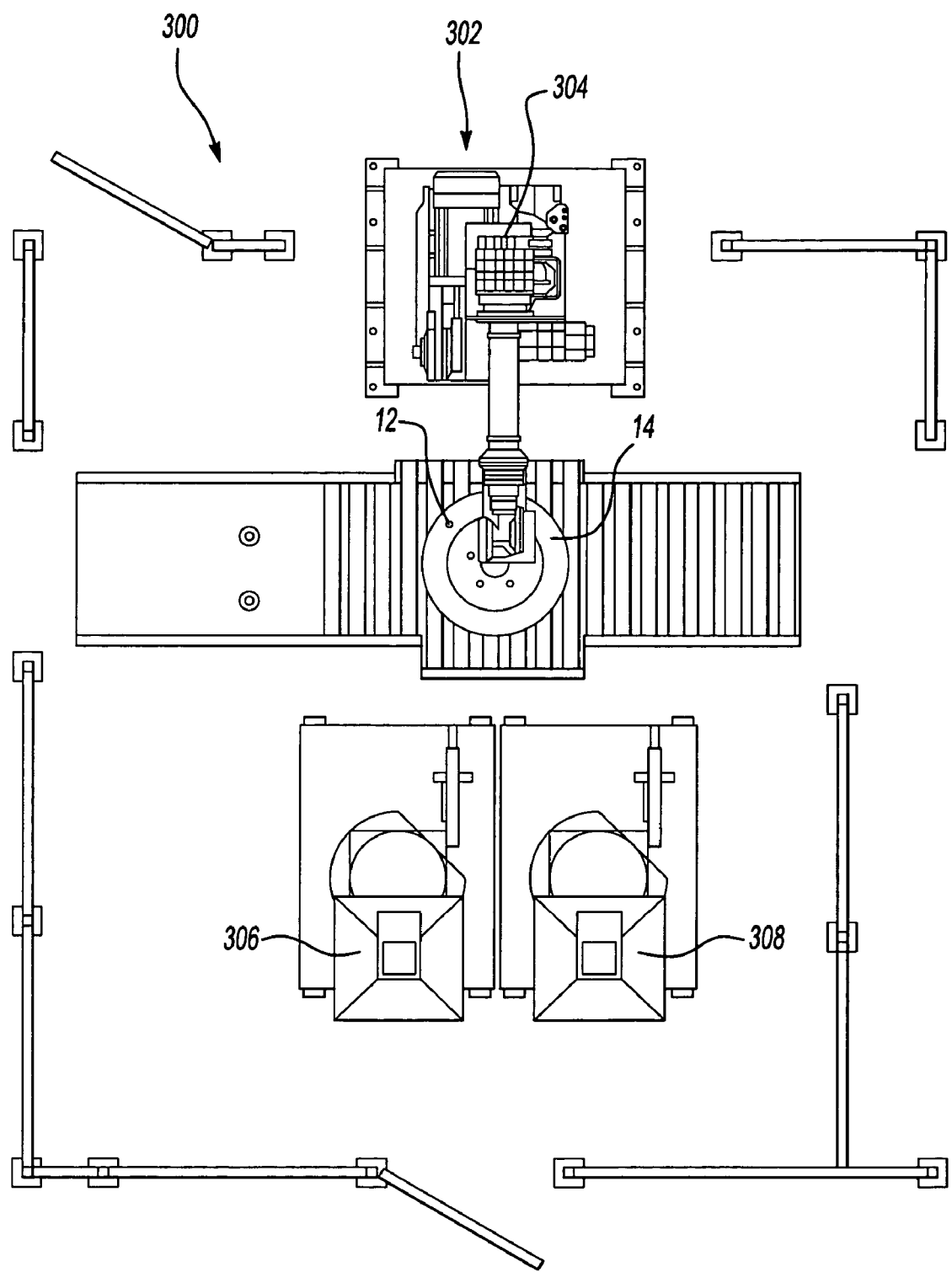
FIG. 7 is a top view of a second alternative embodiment of the valve stem installation system.
Figure 8:
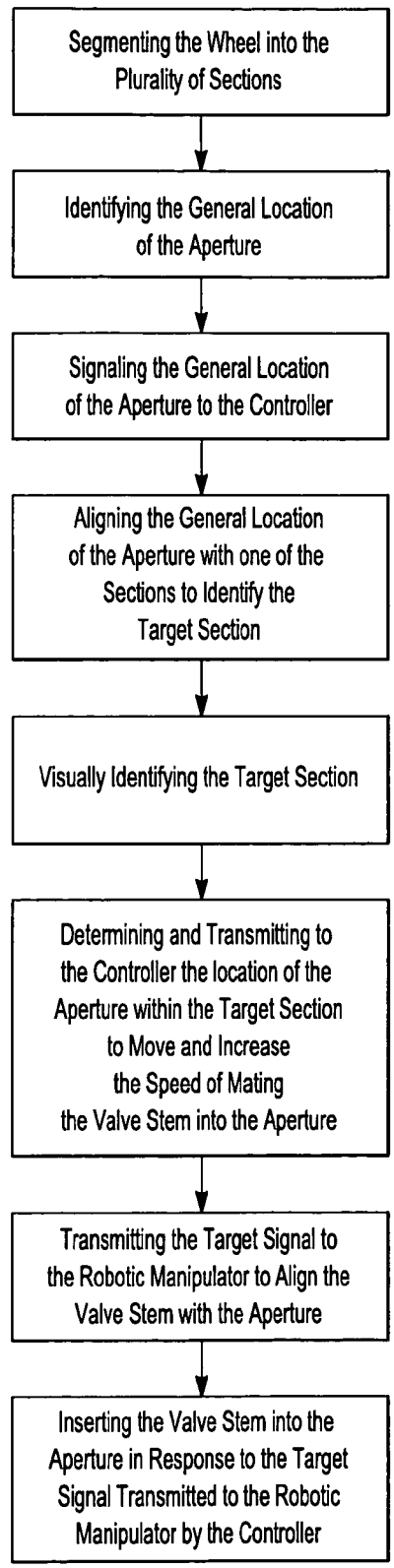
FIG. 8 is a flow diagram of the inventive method.

Referring now to FIG. 7, a second alternative embodiment of the system 10 is generally shown at 300. The system 300 includes a stemming station generally shown at 302 having includes a single robotic device or robot 304 and a plurality of valve stem sorters 306 and 308. Each of the valve stem sorters 306 and 308 sort and position differently configured valve stems. The robot 304 can move to one of the valve stem sorters 306 and 308 to retrieve the valve stem for insertion in the valve stem aperture 12 defined in the wheel 14.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for selectively mating a valve stem with a wheel rim having an aperture formed therein for receiving the valve stem, said system comprising:

a controller for segmenting the wheel into a plurality of sections;

a detector for identifying and signaling a general location of the aperture to said controller as said controller aligns the general location of the aperture with one of the sections thereby identifying a target section;

a robotic manipulator operably connected to said controller for engaging and inserting the valve stem into the aperture; and a sensor of said robotic manipulator adaptable for visually identifying said target section for determining and transmitting to said controller the location of the aperture within said target section thereby adjusting movement and increasing the speed of said robotic manipulator for mating the valve stem into the aperture in response to a target signal transmitted to said robotic manipulator by said controller.

2. A system as set forth in claim 1 wherein said sensor is an optical sensor.

3. A system as set forth in claim 2 including an insertion tool connected to said robotic manipulator with said sensor connected to said insertion tool.

4. A system as set forth in claim 3 wherein said insertion tool is adaptable for selectively engaging at least two types of the valve stem with one of the types being a tire pressure monitoring device (the TPM) and interchangeably moving and inserting one of the valve stem and the TPM into the aperture in response to said target signal received by said robotic manipulator from said controller.

5. A system as set forth in claim 4 wherein said robotic manipulator is further defined by a pair of robots adjacent one and the other with each of said robots including a robot arm connected to a shoulder and multi-axially movable relative to one another and relative to the wheel rim.

6. A system as set forth in claim 5 wherein said insertion tool is further defined by a first inserting device and a second inserting device for engaging one of the TPM and the valve stem.

7. A system as set forth in claim 6 wherein said second inserting device includes a nut runner associated with and slidably movable relative to said second inserting device for assembling a nut with the TPM.

8. A system as set forth in claim 1 including a conveyance device for moving the wheel rims relative to said robotic manipulator.

9. A system as set forth in claim 8 wherein said conveyance device is further defined by a plurality of modules aligned with respect to one another along said conveyance device wherein each of said modules includes a stopping device for preventing the wheel rim from moving along said conveyance device, said stopping device having at least one pin movable between an extended position and a retracted position for preventing the wheel rim from moving along said conveyance device.

10. A system for selectively mating one of a valve stem and a pressure monitoring device (TPM) with a wheel rim having an aperture formed therein for receiving one of the valve stem and the TPM, said system comprising:

a controller for segmenting the wheel into a plurality of sections;

a detector for identifying and signaling a general location of the aperture to said controller as said controller aligns the general location of the aperture with one of the sections thereby identifying a target section transmitted to said controller by a first signal;

a robotic manipulator operably connected to said controller and adaptable for selectively engaging and inserting the valve stem and the TPM into the aperture;

a sensor connected to said robotic manipulator and adaptable for visually identifying said target section and transmitting the general location of the aperture within said target section by a second signal; and said controller adaptable for integrating said first signal and said second signal for generating a target signal transmitted to said robotic manipulator thereby adjusting movement of said robotic manipulator relative said target section for increasing the speed and accuracy of mating one of the TPM and the valve stem into the aperture in response to said target signal.

11. A system as set forth in claim 10 including a comparative software of said controller for integrating said first and second signals.

12. A system as set forth in claim 11 wherein said sensor is an optical sensor.

13. A system as set forth in claim 12 including an insertion tool connected to said robotic manipulator with said sensor connected to said insertion tool.

14. A system as set forth in claim 13 wherein said insertion tool is adaptable for selectively engaging and interchangeably moving and inserting one of the valve stem and the TPM into the aperture in response to said target signal received by said robotic manipulator from said controller.

15. A system as set forth in claim 14 wherein said robotic manipulator is further defined by a pair of robots adjacent one and the other with each of said robots including a robot arm connected to a shoulder and multi-axially movable relative to one another and relative to the wheel rim.

16. A system as set forth in claim 15 wherein said insertion tool is further defined by a first inserting device and a second inserting device for selectively engaging one of the TPM and the valve stem.

17. A system as set forth in claim 16 wherein said second inserting device includes a nut runner associated with and slidably movable relative to said second inserting device for assembling a nut with the TPM.

18. A system as set forth in claim 10 including a conveyance device for moving the wheel rims relative to said robotic manipulator.

* * * * *